United States Patent
Kupferman

(10) Patent No.: US 7,023,639 B1
(45) Date of Patent: Apr. 4, 2006

(54) SERVO SYNCHRONIZATION VALIDATION TECHNIQUES BASED ON BOTH SERVO SYNCH MARKS AND WEDGE IDENTIFIERS IN A ROTATING MEDIA STORAGE DEVICE

(75) Inventor: Hanan Kupferman, Diamond Bar, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 72 days.

(21) Appl. No.: 10/815,508

(22) Filed: Mar. 31, 2004

(51) Int. Cl.
*G11B 5/09* (2006.01)

(52) U.S. Cl. ............................. 360/51; 360/46; 360/48; 360/49; 360/53

(58) Field of Classification Search ...................... None
See application file for complete search history.

(56) References Cited

U.S. PATENT DOCUMENTS

| | | | | |
|---|---|---|---|---|
| 5,477,103 A | * | 12/1995 | Romano et al. | 318/601 |
| 5,740,358 A | * | 4/1998 | Geldman et al. | 714/47 |
| 6,009,549 A | * | 12/1999 | Bliss et al. | 714/769 |
| 6,058,084 A | * | 5/2000 | Yamamoto et al. | 360/51 |
| 6,108,151 A | * | 8/2000 | Tuttle et al. | 360/51 |
| 6,108,153 A | * | 8/2000 | Glover | 360/51 |
| 6,201,652 B1 | * | 3/2001 | Rezzi et al. | 360/40 |
| 6,411,452 B1 | * | 6/2002 | Cloke | 360/51 |
| 6,580,573 B1 | * | 6/2003 | Hull et al. | 360/46 |
| 6,603,622 B1 | * | 8/2003 | Christiansen et al. | 360/66 |
| 6,639,748 B1 | * | 10/2003 | Christiansen et al. | 360/66 |
| 6,934,104 B1 | * | 8/2005 | Kupferman | 360/51 |
| 2003/0048560 A1 | * | 3/2003 | Ozdemir | 360/48 |
| 2003/0048562 A1 | * | 3/2003 | Heydari et al. | 360/51 |

\* cited by examiner

*Primary Examiner*—David Hudspeth
*Assistant Examiner*—Dismery Mercedes
(74) *Attorney, Agent, or Firm*—Jason T. Evans, Esq.; Blakely, Sokoloff, Taylor & Zafman

(57) ABSTRACT

Disclosed is a rotatable media storage device (RMSD) connectable to a host. The RMSD include a movable head to perform track following, a disk, and a synch mark detection circuit. The disk includes a circumferential track that has a plurality of embedded servo wedges utilized in track following. The synch mark detection circuit has a first detection mode and a second detection mode. In the first detection mode, the synch mark detection circuit detects a servo synchronization signal based on the head reading a SSM of a servo header of an embedded servo wedge. In the second detection mode, the synch mark detection circuit detects a servo synchronization signal based on the head reading a SSM and a wedge identifier of a servo header of an embedded servo wedge. The wedge ID is utilized in conjunction with the SSM to validate the servo synchronization signal.

23 Claims, 5 Drawing Sheets

SERVO SYNCHRONIZATION VALIDATION TECHNIQUES BASED ON BOTH SERVO SYNCH MARKS AND WEDGE IDENTIFIERS IN A ROTATING MEDIA STORAGE DEVICE

BACKGROUND OF THE INVENTION

1. Field of the Invention

The present invention relates to rotating media storage devices (RMSDs). More particularly, the present invention relates to an RMSD that utilizes servo synchronization validation techniques based on both servo synch marks (SSMs) and wedge identifiers (IDs).

2. Description of the Prior Art and Related Information

Computer systems rely on rotating media storage devices (RMSDs), which often employ a moveable head actuator to frequently access large amounts of data stored on the media. One example of an RMSD is a hard disk drive. A conventional hard disk drive has a head disk assembly ("HDA") including at least one magnetic disk ("disk"), a spindle motor for rapidly rotating the disk, and a head stack assembly ("HSA") that includes a head gimbal assembly (HGA) with a moveable transducer head for reading and writing data. The HSA forms part of a servo control system that positions the transducer head over a particular track on the disk to read or write information from that track.

With reference to FIG. 1, FIG. 1 shows an example of a prior art disk 10 having a plurality of concentric tracks 12. Each surface of each disk 10 conventionally contains a plurality of concentric data tracks 12 angularly divided into a plurality of data sectors 15. In addition, special servo information is provided on each disk to determine the position of the moveable transducer head.

The most popular form of servo is called "embedded servo" wherein the servo information is written in a plurality of servo wedges 14a, 14b, etc. that are angularly spaced from one another and are interspersed between data sectors 15 around each track of each disk.

Each servo wedge 14 typically includes a servo header having a phase lock loop (PLL) field 20, a servo synch mark (SSM) field 22, a track identification (TKID) field 24, a wedge ID field 26 having a binary encoded wedge ID number to identify the wedge, and a group of servo bursts (e.g. ABCD) 26 (e.g. an alternating pattern of magnetic transitions) which the servo control system samples to align the moveable transducer head with or relative to a particular servo track or one or more corresponding data tracks.

Typically, the servo control system moves the transducer head toward a desired track during a coarse "seek" mode using the TKID field as a control input. However, in processing information, it is necessary to ensure consistency in the detection of bits composing a block of bits. One common approach directed to ensuring such consistency employs multiple stored fields including a phase lock loop (PLL) field 20 to facilitate bit synchronization and a synch field to facilitate block synchronization. The synch field facilitates block synchronization by holding a special marker that is detected to "frame" data, i.e., to identify a boundary of a block. In contemporary hard disk drives employing embedded servos, it is well known to provide framing of servo data via a servo synch mark (SSM) field 22.

Generally, in hard disk drives, a servo synchronization signal based on the head reading a servo synchronization mark (SSM) results in a read/write channel of the disk drive establishing a precise timing reference point for read/write operations.

Once the transducer head is generally over the desired track, the servo control system uses the servo bursts (e.g. ABCD) 28 to keep the transducer head over that track in a fine "track follow" mode. During track following mode, the moveable transducer head repeatedly reads the wedge ID field 26 of each successive servo wedge 14 to obtain the binary encoded wedge ID number that identifies each wedge of the track. In this way, the servo control system continuously knows where the moveable head is relative to the disk.

As previously discussed, a servo synchronization signal based on the head reading a servo synchronization mark (SSM) 22 typically causes a read/write channel of a disk drive to establish a precise timing reference point for any read/write operations. Thus, it is important that the servo synchronization signal be robust and timely. To that end, the SSM pattern should be unique such that it will not be identified in other areas of the servo wedge. Particularly, it is important that the SSM pattern not be mistakenly identified by the TKID field 24, the wedge ID field 26, the servo (e.g. ABCD) bursts 28, etc.

If the SSM pattern is mistakenly identified in one of the other areas of the servo wedge, read/write operations may be compromised resulting in the wrong data being read, or, data being written to areas of the disk that it is not supposed to be. Unfortunately, currently SSM patterns are not sufficiently unique and are sometimes misrecognized in other areas of the servo wedge.

SUMMARY OF THE INVENTION

The present invention relates to servo synchronization validation techniques based on both servo synch marks (SSMs) and wedge identifiers (IDs) in a rotating media storage device (RMSD).

In one aspect, the invention may be regarded as an RMSD connectable to a host. The RMSD include a movable head to perform track following, a disk, and a synch mark detection circuit. The disk includes a circumferential track that has a plurality of embedded servo wedges utilized in track following. The plurality of wedges are spaced sequentially around a circumference of the circumferential track. The synch mark detection circuit has a first detection mode and a second detection mode. In the first detection mode, the synch mark detection circuit detects a servo synchronization signal based on the head reading a SSM of a servo header of an embedded servo wedge. In the second detection mode, the synch mark detection circuit detects a servo synchronization signal based on the head reading a SSM and a wedge identifier of a servo header of an embedded servo wedge. In this case, the wedge ID is utilized in conjunction with the SSM to validate the servo synchronization signal.

In one embodiment, a substantial majority of the plurality of embedded servo wedges each includes a servo header having a concatenated SSM and wedge ID for detecting a servo synchronization signal when read by the head. In one example, the concatenated SSM and wedge ID may be located adjacent to a phase lock loop (PLL) field. The concatenated SSM and wedge ID may also be located adjacent to a track identification field (TKID).

In one embodiment, the synch mark detection circuit receives a first SSM and a first wedge ID and decodes the first SSM and the first wedge ID. The synch mark detection circuit further receives a second SSM and a second wedge ID and decodes the second SSM and the second wedge ID. The synch mark detection circuit then determines if the second wedge ID has incremented at an expected rate. If the second wedge ID has incremented at an expected rate in comparison to the first wedge ID, the synch mark detection circuit may declare a hard servo synchronization mode based upon a forecasted wedge ID pattern. The hard servo synchronization mode based upon the forecasted wedge ID pattern includes performing servo synchronization based upon determining that subsequent wedge ID's of subsequent servo headers include accurately forecasted wedge ID numbers based on the forecasted wedge ID pattern.

In a further aspect, the invention may be regarded as a method for performing servo synchronization in an RMSD. The method includes detecting a servo synchronization signal in a first mode based upon the head reading a servo synchronization mark (SSM) of a servo header of an embedded servo wedge and detecting a servo synchronization signal in a second mode based upon the head reading a first SSM and a first wedge identifier (ID) of a first servo header of an embedded servo wedge. In the second mode, the first wedge ID is utilized in conjunction with the first SSM to validate the servo synchronization signal. Particularly, in the second detection mode, if it is determined that a second wedge ID of a second servo header has incremented at an expected rate in comparison to the first wedge ID of the first servo header then a hard servo synchronization mode is declared based upon the forecasted wedge ID pattern.

In yet another aspect, the invention may be regarded as a computer system including a host computer and a RMSD, in which the RMSD further comprises a moveable head to perform track following, a disk, and a synch mark detection circuit. The disk includes a circumferential track having a plurality of embedded servo wedges utilized in track following. The plurality of wedges are spaced sequentially around a circumference of the circumferential track. The synch mark detection circuit has a first detection mode and a second detection mode. In the first detection mode, a synch mark detection circuit detects a servo synchronization signal based on the head reading a SSM of a servo header of an embedded servo wedge. In the second detection mode, the synch mark detection circuit detects a servo synchronization signal based on the head reading a SSM and a wedge ID of a servo header of an embedded servo wedge. The wedge ID is utilized in conjunction with the SSM to validate the servo synchronization signal.

The foregoing and other features of the invention are described in detail and are set forth in the appended claims.

DETAILED DESCRIPTION

Figure 1:
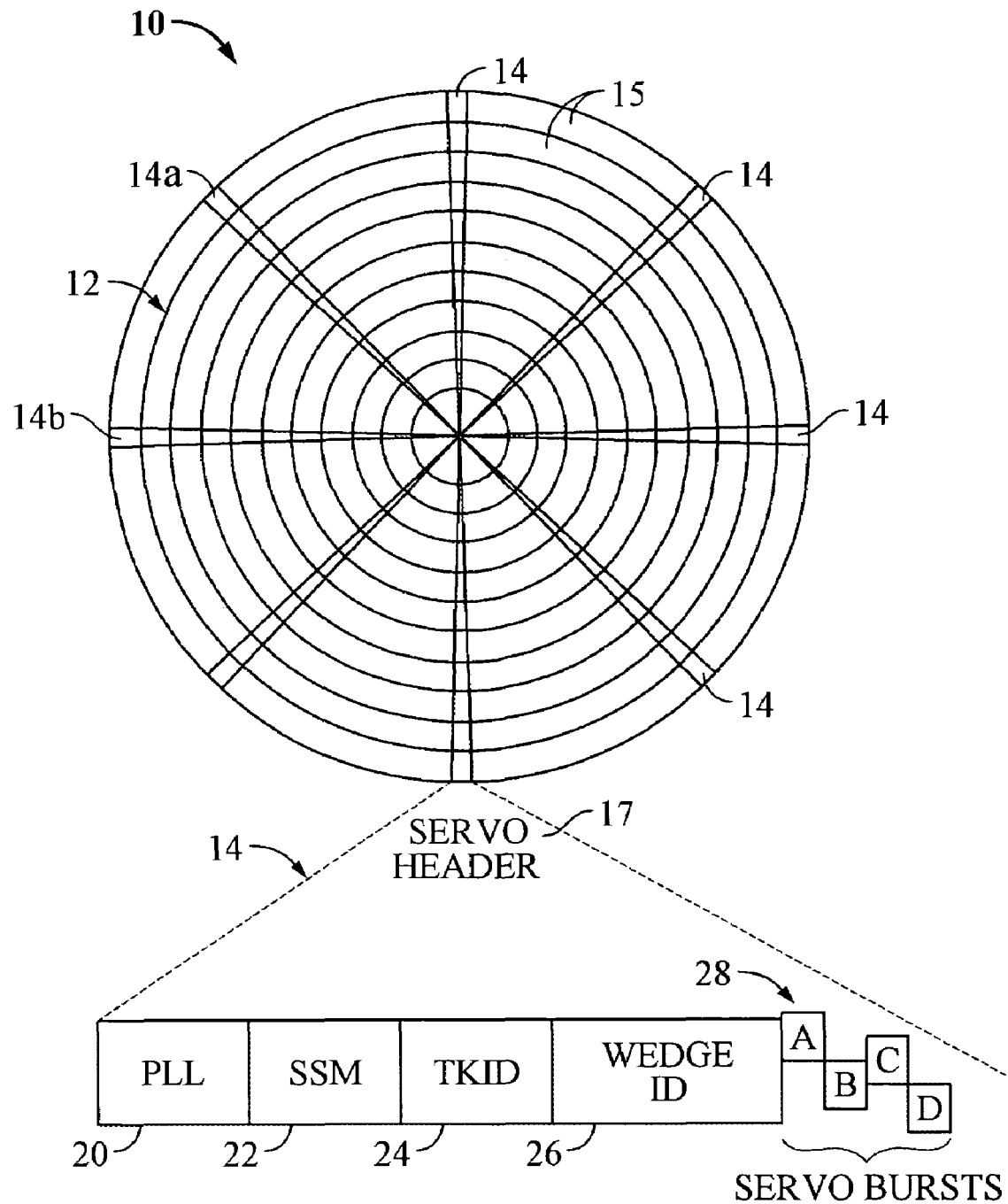
FIG. 1 shows an example of a prior art disk having a plurality of concentric tracks.
Figure 2:
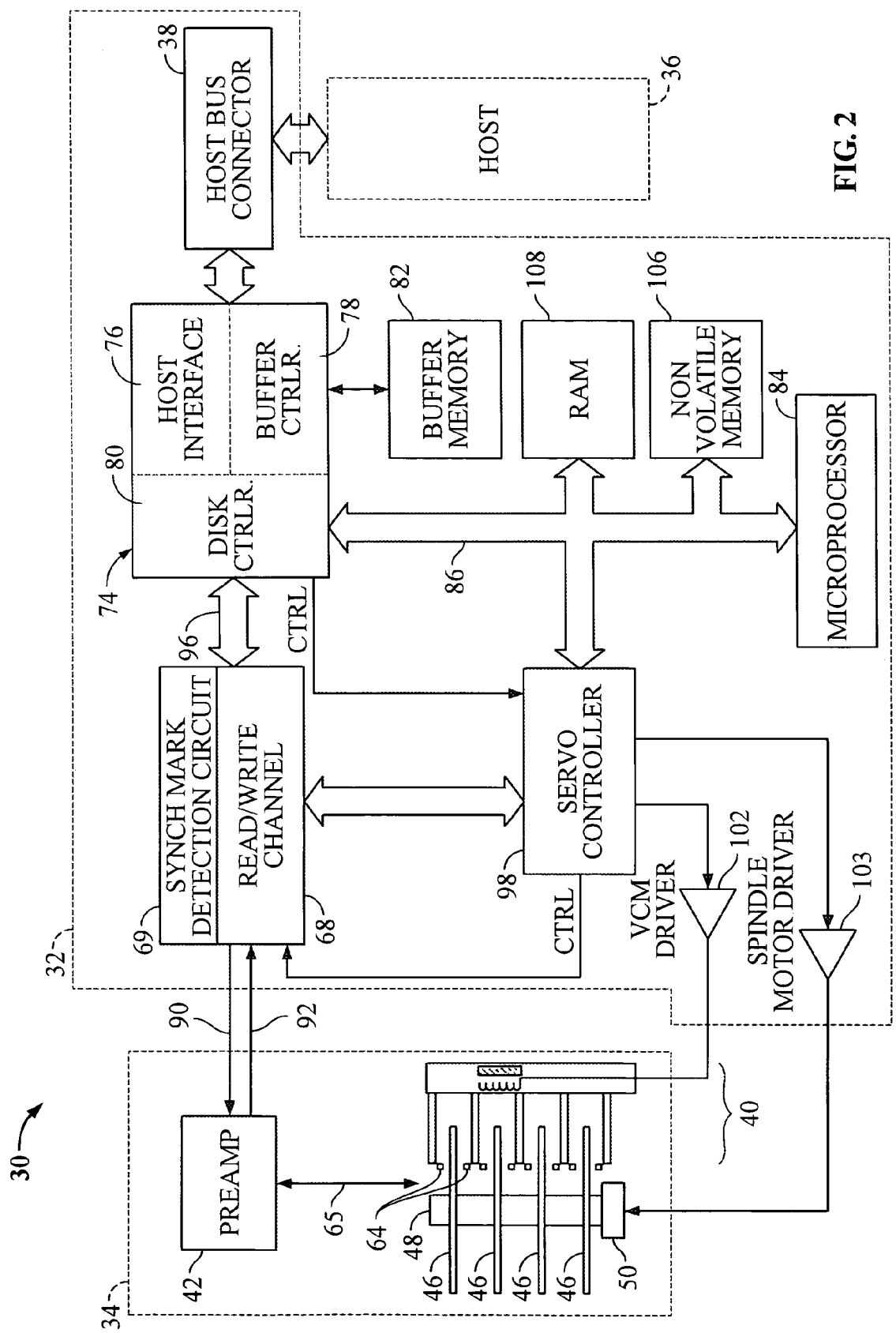
FIG. 2 shows a block diagram of a rotating media storage device (RMSD), such as a disk drive, in which embodiments of the invention may be practiced.

FIG. 2 shows a block diagram of a rotating media storage device (RMSD), such as disk drive 30, in which the invention may be practiced. Disk drive 30 is connected to a host computer 36 via host bus connector 38 for the transfer of commands, status and data. One suitable standard for such connection is the Advance Technology Attachment (ATA) standard presently favored for desktop personal computers. Disk drive 30 comprises a Head/Disk Assembly, HDA 34, and a controller printed circuit board assembly, PCBA 32.

The HDA 34 comprises: one or more disks 46 for data storage; a spindle motor 50 for rapidly spinning each disk 46 (four shown) on a spindle 48; and an actuator assembly 40 for moving a plurality of heads 64 in unison over each disk 46. The heads 64 are connected to a preamplifier 42 via a cable assembly 65 for reading and writing data on disks 46. Preamplifier 42 is connected to channel circuitry in controller PCBA 32 via read data line 92 and write data line 90.

Controller PCBA 32 comprises a read/write channel 68, servo controller 98, host interface and disk controller HIDC 74, voice coil motor driver VCM 102, spindle motor driver SMD 103, microprocessor 84, and several memory arrays— buffer or cache memory 82, RAM 108, and non-volatile memory 106.

Read/write channel 68 may include a servo synch mark detection circuit 69, which under the control of a program or routine, may execute methods or processes in accordance with embodiments of the invention to perform servo synchronization validation techniques based on both servo synch marks (SSMs) and wedge identifiers (IDs). For example, servo synch mark detection circuit 69 may be an application specific integrated circuit (ASIC) or other suitable type of circuit. Further, microprocessor 84 may pre-program the servo synch mark detection circuit 69 and/or initialize the servo synch mark detection circuit with initial and operational values to perform servo synchronization validation techniques based on both servo synch marks (SSMs) and wedge identifiers (IDs). Although the servo synch mark detection circuit 69 is shown as part of the read/write channel 68, it should be appreciated that it may be located elsewhere in the disk drive 30.

Host initiated operations for reading and writing data in disk drive 30 are executed under control of microprocessor 84 connected to the controllers and memory arrays via a bus 86. Program code executed by microprocessor 84 is stored in non-volatile memory 106 and random access memory RAM 108. Program overlay code stored on reserved tracks of disks 46 may also be loaded into RAM 108 as required for execution.

During disk read and write operations, data transferred by preamplifier 42 is encoded and decoded by read/write channel 68. During read operations, channel 68 decodes data into digital bits transferred on an NRZ bus 96 to HIDC 74. During write operations, HIDC provides digital data over the NRZ bus to channel 68 which encodes the data prior to its transmittal to preamplifier 42. Preferably, channel 68 employs PRML (partial response maximum likelihood) coding techniques, although the invention may be practiced with equal advantage using other coding processes.

HIDC 74 comprises a disk controller 80 for formatting and providing error detection and correction of disk data, a host interface controller 76 for responding to commands from host 36, and a buffer controller 78 for storing data which is transferred between disks 46 and host 36. Collectively the controllers in HIDC 74 provide automated functions which assist microprocessor 84 in controlling disk operations.

A servo controller 98 provides an interface between microprocessor 84 and actuator assembly 40 and spindle motor 50. Microprocessor 84 commands logic in servo controller 98 to position actuator 40 using a VCM driver 102 and to precisely control the rotation of spindle motor 50 with a spindle motor driver 103.

Preferably, disk drive 30 employs a sampled servo system in which equally spaced servo wedge sectors (sometimes termed "servo wedges") are recorded on each track of each disk 46. Data sectors are recorded in the intervals between servo sectors on each track. Servo sectors are sampled at regular intervals to provide servo position information to microprocessor 84. Servo sectors are received by channel 68, and are processed by servo controller 98 to provide position information to microprocessor 84 via bus 86. Further, as previously discussed, read/write channel 68 may include a servo synch mark detection circuit 69, which under the control of a program or routine, may execute methods or processes in accordance with embodiments of the invention to perform servo synchronization validation techniques based on both servo synch marks (SSMs) and wedge identifiers (IDs).

Figure 3:
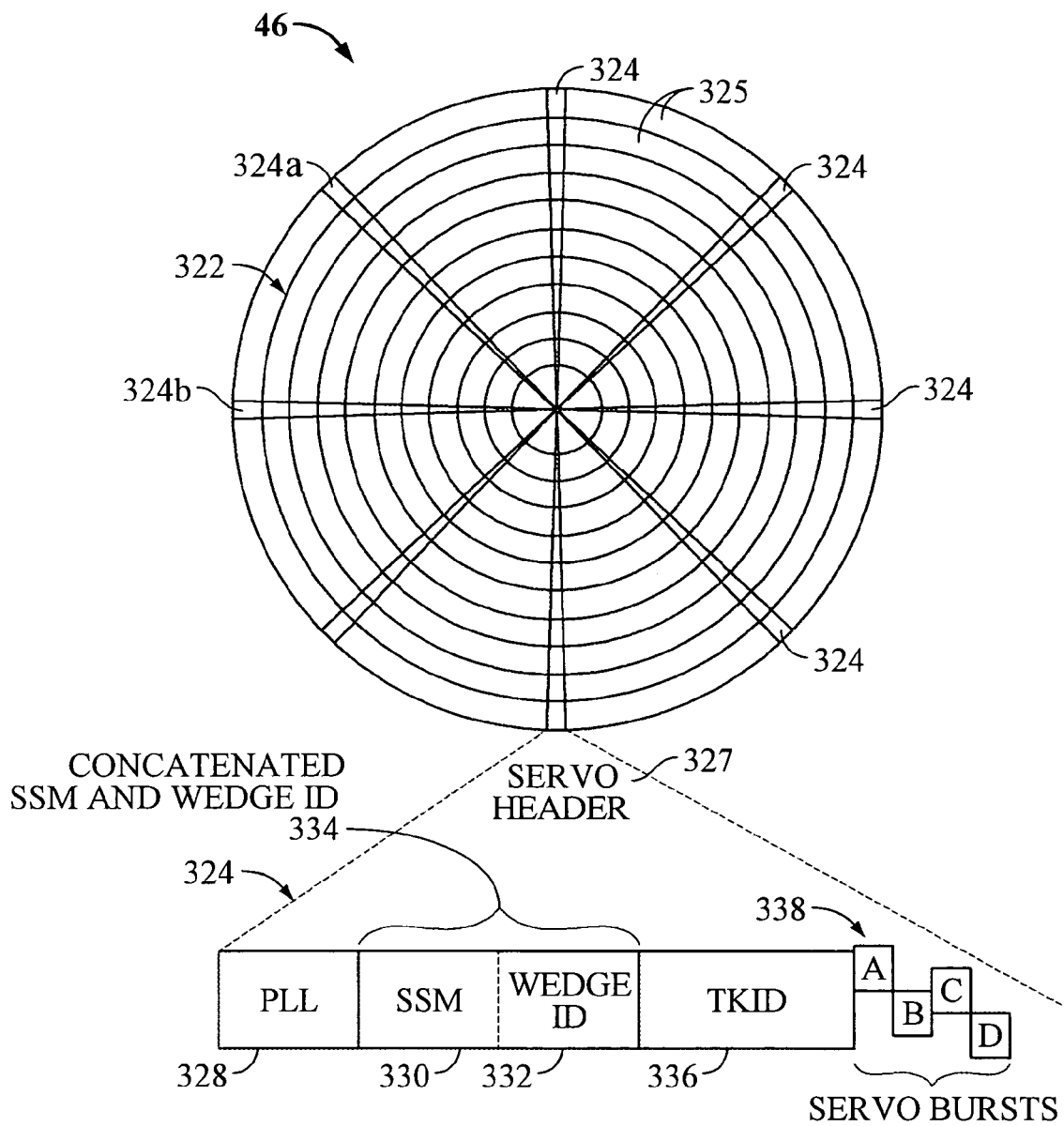
FIG. 3 shows a disk of a disk drive having a plurality of concentric tracks, and particularly illustrates a concatenated servo synch mark (SSM) and wedge identifier (ID), according to one embodiment of the present invention.

With reference also to FIG. 3, FIG. 3 shows a disk 46 of a disk drive having a plurality of concentric tracks, and more particularly, illustrates a concatenated servo synch mark (SSM) and wedge identifier (ID), according to one embodiment of the present invention. The disk 46 includes a plurality of concentric circumferential tracks 322. Each circumferential track 322 includes a plurality of embedded servo wedges 324 utilized in track following. The plurality of servo wedges 324 are spaced sequentially around a circumference of the circumferential track 322. For example, the embedded servo wedges 324a, 324b, etc., contain servo information utilized in track following and are interspersed between data regions 325 of the disk 46. Data is conventionally written in the data regions 325 in a plurality of discrete data sectors. Each data region 325 is typically preceded by a servo wedge 324.

Each servo wedge 324 includes a servo header 327 having a phase lock loop (PLL) field 328, a concatenated SSM and wedge ID field 334 including a servo synch mark (SSM) 330 and a wedge identifier (ID) 332, a track identification (TKID) field 336, and a group of servo bursts (e.g. ABCD) 338 (e.g. an alternating pattern of magnetic transitions) which the servo control system samples to align the moveable transducer head with, and relative to, a particular servo track of one or more corresponding data tracks.

Typically, the servo controller 98 moves the transducer head 64 toward a desired track during a coarse "seek" mode using the TKID field 336 as a control input. However, in processing information, it is necessary to ensure consistency in the detection of bits composing a block of bits. In order to ensure such consistency, the phase lock loop (PLL) field 328 is first read in order to facilitate bit synchronization. Next, the servo synch mark 330 is read to facilitate block synchronization. The SSM 330 facilitates block synchronization by acting as a special marker that is detected to "frame" data, i.e., to identify a boundary of a block. It is well known to provide framing of servo data via a SSM 330.

The wedge ID 332 is a binary encoded wedge ID number to identify the wedge. In one embodiment of the invention, the SSM 330 and the wedge ID 332 are concatenated into a combined SSM and wedge ID 334, as shown in FIG. 3. As will be discussed, the concatenated SSM and wedge ID 334 of the servo header 327 is utilized for detecting a servo synchronization signal when read by the head 64 and in order to validate the servo synchronization signal.

A valid servo synchronization signal results in the read/write channel 68 of the disk drive 30 establishing a precise timing reference point for read/write operations.

Further, it should be noted that once the transducer head 64 is generally over a desired track 322, the servo controller 98 uses the servo bursts (e.g. ABCD) 338 to keep the transducer head 64 over the track in a find "track follow" mode. During track following mode, the moveable transducer head 64 repeatedly reads the wedge ID 332 of each successive servo wedge 327 to obtain the binary encoded wedge ID number that identifies each wedge of the track. In this way, the servo controller 98 continuously knows where the head 64 is relative to the disk 46. In one example, a disk track 322 may have 256 wedges (e.g. 0–255) and may have a corresponding binary encoded wedge ID number (e.g. 00000000-11111111). Of course, it should be appreciated, that the disk may have any number of servo wedges and may utilize a wide variety of different encoding schemes.

As previously discussed, a valid servo synchronization signal typically causes the read/write channel 68 to establish a precise timing reference point for read/write operations. Thus, it is important that the servo synchronization signal be robust and timely.

In one embodiment, the present invention relates to servo synchronization validation techniques based on the use of both a SSM and a wedge ID, in order to provide a very unique identifier for validating a servo synchronization signal. Particularly, as previously discussed, read/write channel 68 may include a servo synch mark detection circuit 69, which under the control of a program or routine, may execute methods or processes in accordance with the embodiments of the invention to perform servo synchronization validation based on both SSMs and wedge IDs.

More particularly, in one embodiment, the synch mark detection circuit 69 has a first detection mode and a second detection mode. In the first detection mode, the synch mark detection circuit 69 detects a valid servo synchronization signal based only on the head 64 reading a SSM 330 of the servo header 327 of an embedded servo wedge.

In the second detection mode, the synch mark detection circuit 69 detects a valid servo synchronization signal based on the head 64 reading both the SSM 330 and the wedge ID 332 of the concatenated SSM and wedge ID field 334 of the servo header 327 of an embedded servo wedge. In the second detection mode, the wedge ID 332 is utilized in conjunction with the SSM 330 in order to validate the servo synchronization signal.

In one embodiment, in the second detection mode, the synch mark detection circuit 69 receives a first SSM and a first wedge ID of a first concatenated SSM and wedge ID field and decodes the first SSM and the first wedge ID. If the synch mark detection circuit 69 detects a servo synchronization signal based on the head reading the first SSM then the servo synchronization signal is initially considered valid. Next, the synch mark detection circuit 69 further receives a second SSM and a second wedge ID of a next concatenated SSM and wedge ID field and decodes the second SSM and second wedge ID. Assuming the second SSM is properly detected, the synch mark detection circuit 69 then determines if the second wedge ID has incremented at an expected rate. For example, if the wedges are expected to increment in intervals of 1, and the first wedge was 5, the second wedge should be 6 (e.g. wedge ID pattern=(0, 1, 2, . . . 5, 6, 7, . . . 255, 0 . . . etc.)).

If the second wedge ID has incremented at the expected rate in comparison to the first wedge ID, the synch mark detection circuit 69 declares a "hard servo synchronization mode" based upon the forecasted wedge ID pattern. The hard servo synchronization mode based upon the forecasted wedge ID pattern includes performing servo synchronization validation based upon determining that subsequent wedge IDs of subsequent servo headers include accurately forecasted wedge ID numbers based upon the forecasted wedge ID pattern.

Figure 4:
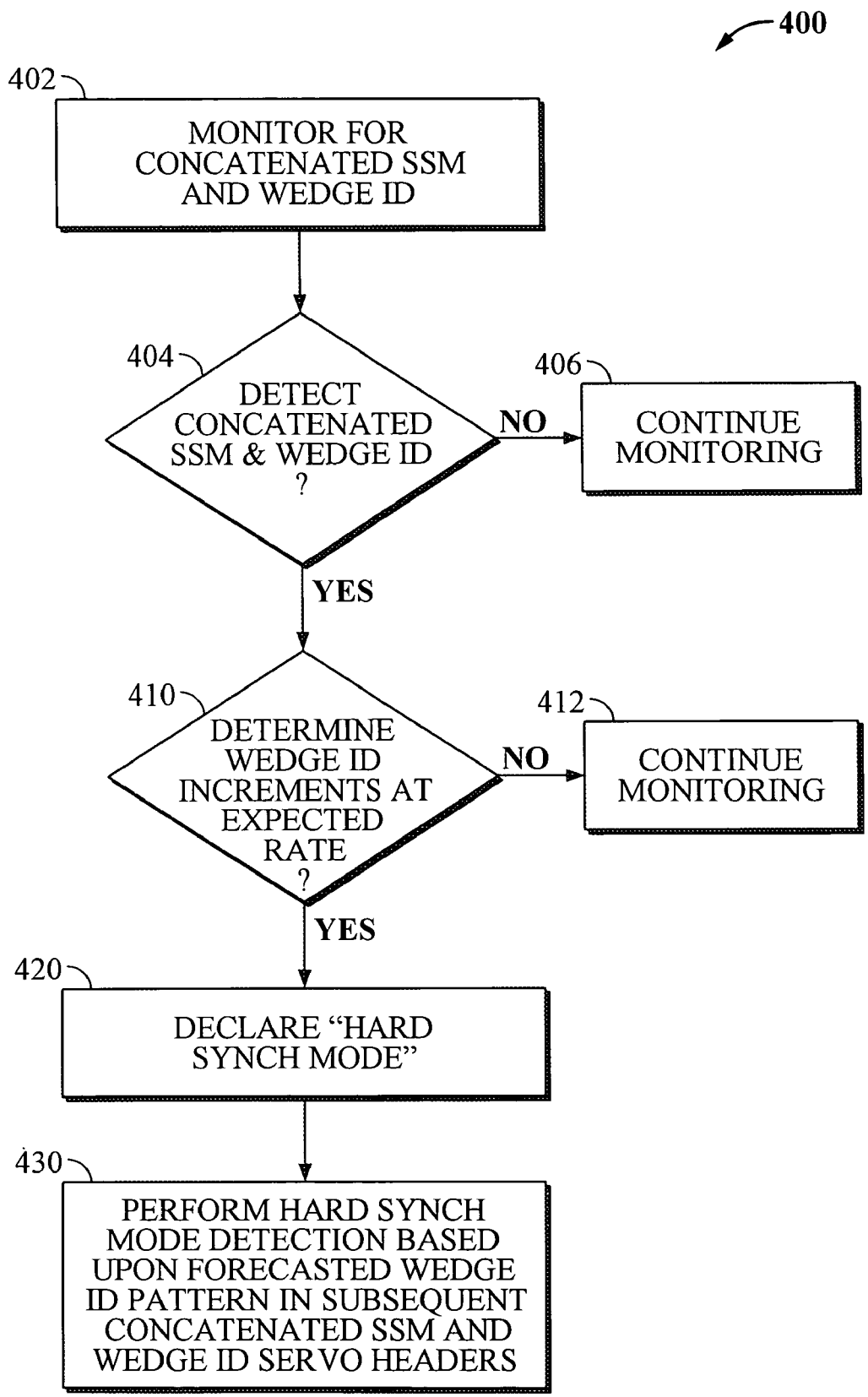
FIG. 4 is a flow chart of a method for implementing servo synchronization validation techniques based on both servo synch marks (SSMs) and wedge identifiers (IDs), according to one embodiment of the present invention.

Now turning to FIG. 4, FIG. 4 is a flow chart of a method 400 of the invention for implementing servo synchronization validation techniques based on both servo synch marks (SSMs) and wedge identifiers (IDs). At step 402, the method 400 implementable, for example, by a synch mark detection circuit, monitors for a concatenated SSM and wedge ID field. Next, at step 404, it is determined whether a concatenated SSM and wedge ID has been detected, including a valid detected SSM. If not, continued monitoring (step 406) is performed.

However, if a concatenated SSM and wedge ID is detected it is next determined at step 410 whether or not the wedge ID is incrementing at an expected rate. If not, continued monitoring (step 412) is performed.

Figure 5:
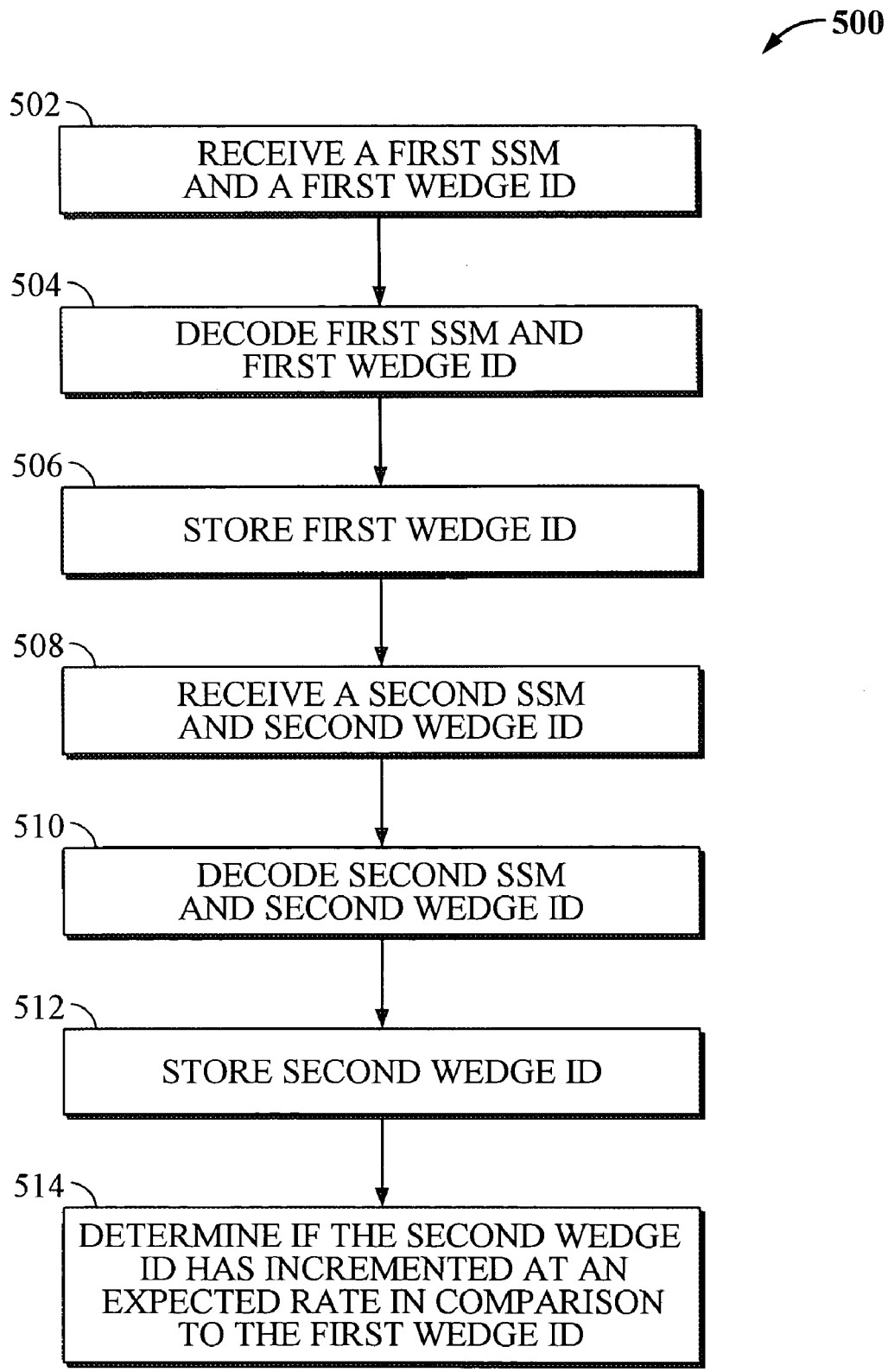
FIG. 5 is a flow chart illustrating a more detailed method of receiving and decoding first and second SSMs and first and second wedge ID's, respectively, in performing servo synchronization validation techniques, according to one embodiment of the present invention.

Turning briefly to FIG. 5, FIG. 5 is a flow chart illustrating a detailed method for determining whether the wedge ID has incremented at an expected rate, according on one embodiment of the present invention. Particularly, FIG. 5 is a flow chart illustrating a detailed method 500 of receiving and decoding first and second SSMs and first and second wedge IDs, respectively, from the concatenated SSM and wedge IDs, for performing servo synchronization validation techniques.

At step 502, a first SSM and a first wedge ID from a first concatenated SSM and wedge ID field are received. Next, at step 504, the first SSM and first wedge ID are decoded. The first wedge ID is further stored (step 506).

Next, a second SSM and a second wedge ID from a second concatenated SSM and wedge ID field are received (step 508). Next, at step 510, the second SSM and second wedge ID are decoded. The second wedge ID value is also stored (step 512). At step 514, it is then determined if the second wedge ID has incremented at an expected rate in comparison to the first wedge ID. For example, if the wedge IDs are expected to increment in intervals of 1, and the first decoded wedge ID value was 5, and the second decoded wedge ID value was 6, based on a wedge ID pattern of (0, 1, 2, 3 . . . 5, 6, 7 . . . 255, 0 . . . ), then the method 500 would correctly determine that the wedge IDs are incrementing at an expected rate. Accordingly, the servo synchronization signal, based on the incrementing wedge ID, may or may not be validated.

Returning to FIG. 4, a "hard synchronization mode" is declared at step 420 if the wedge ID incremented at the expected rate. However, if the wedge ID did not increment at the expected rate, it may be assumed that the servo synchronization signal is not valid and at step 412 the method 400 continues monitoring. In this case, it may be assumed that the first or second SSM was incorrectly identified.

After the hard synchronization mode has been declared at step 420, at step 430, hard synchronization mode detection is performed based upon the forecasted wedge ID pattern for subsequent concatenated SSM and wedge ID servo header in conjunction with receiving valid detected SSMs.

For instance, continuing with the previous example, assuming the forecasted wedge ID pattern is 0, 1, 2, 3 . . . 5, 6, 7, 8, 9 . . . 255, 0, 1, 2 . . . (and the last decoded wedge ID number of the concatenated SSM and wedge ID field was a decoded value of 6), then the next decoded wedge ID value should be 7, after that the next decoded value should be 8, etc. Thus, the continued validation of the servo synchronization signals is conditioned on receiving valid subsequent forecasted wedge IDs.

Accordingly, the continued validation of the servo synchronization signal is conditioned both on receiving a valid SSM, as well as a valid forecasted wedge ID. The SSM is a fixed value and the wedge ID is a variable.

Thus, the validation of a servo synchronization signal is based both on SSMs and wedge IDs. More particularly, the validation of a servo synchronization field is not only based on receiving a valid SSM, but on receiving both a valid SSM and a valid wedge ID based upon a forecasted wedge ID pattern.

Although, this technique is a bit more computationally intensive than purely relying on the SSM to validate the servo synchronization signal, the use of both the SSM and the wedge ID provides a great deal of reliability in ensuring a valid servo synchronization signal—versus relying solely on a SSM field. This is because SSM patterns may sometimes be misrecognized in other areas of the servo wedge such that read/write operations may be compromised resulting in the wrong data being read, or data being written to areas of the disk that it is not supposed to be. By performing servo synchronization validation based on both SSMs and wedge IDs, the chance of incorrectly validating a servo synchronization signal is significantly reduced.

The methods previously discussed can be employed for disk drives with an embedded servo system. However, numerous alternatives for RMSDs with similar or other media format characteristics can be employed by those skilled in the art to use the invention with equal advantage to implement servo synchronization validation techniques. Further, although the embodiments have been described in the context of a disk drive with embedded servo sectors, the invention can be employed in many different types of RMSDs having a head actuator that scans the media.

I claim:

1. A rotating media storage device (RMSD) connectable to a host, the RMSD comprising:
   a moveable head to perform track following;
   a disk having a circumferential track, the circumferential track having a plurality of embedded servo wedges utilized in track following, the plurality of wedges being spaced sequentially around a circumference of the circumferential track; and
   a synch mark detection circuit having a first detection mode and a second detection mode, wherein, in the first detection mode, the synch mark detection circuit detects a servo synchronization signal based on the head reading a servo synchronization mark (SSM) of a servo header of an embedded servo wedge,
   wherein, in the second detection mode, the synch mark detection circuit detects a servo synchronization signal based on the head reading a SSM and a wedge identifier (ID) of a servo header of an embedded servo wedge, the wedge ID being utilized in conjunction with the SSM to validate the servo synchronization signal.

2. The RMSD of claim 1, wherein a substantial majority of the plurality of embedded servo wedges each include a servo header having a concatenated SSM and wedge ID for detecting a servo synchronization signal when read by the head.

3. The RMSD of claim 2, wherein the concatenated SSM and wedge ID is located adjacent to a phase lock loop (PLL) field.

4. The RMSD of claim 3, wherein the concatenated SSM and wedge ID is located adjacent to a track identification field (TKID).

5. The RMSD of claim 1, wherein the synch mark detection circuit to further,
receive a first SSM and a first wedge ID; and
decode the first SSM and the first wedge ID.

6. The RMSD of claim 5, wherein the synch mark detection circuit to further,
receive a second SSM and a second wedge ID;
decode the second SSM and the second wedge ID; and
determine if the second wedge ID has incremented at an expected rate.

7. The RMSD of claim 6, wherein, if the second wedge ID has incremented at an expected rate in comparison to the first wedge ID, the synch mark detection circuit to declare a hard servo synchronization mode based upon a forecasted wedge ID pattern.

8. The RMSD of claim 7, wherein the hard servo synchronization mode based upon the forecasted wedge ID pattern includes performing servo synchronization based upon determining that subsequent wedge IDs of subsequent servo headers include accurately forecasted wedge ID numbers based upon the forecasted wedge ID pattern.

9. In a rotating media storage device (RMSD) connectable to a host, the RMSD including a disk having a circumferential track with a plurality of embedded servo wedges utilized in track following, the plurality of wedges being spaced sequentially around a circumference of the circumferential track, and a moveable head to perform track following, a method for performing servo synchronization comprising:
detecting a servo synchronization signal in a first mode based on the head reading a first servo synchronization mark (SSM) of a servo header of an embedded servo wedge;
detecting a servo synchronization signal in a second mode based on the head reading a first SSM and a first wedge identifier (ID) of a first servo header of an embedded servo wedge, the first wedge ID being utilized in conjunction with the first SSM to validate the servo synchronization signal, and in the second detection mode,
determining if a second wedge ID of a second servo header has incremented at an expected rate in comparison to the first wedge ID of the first servo header; and
declaring a hard servo synchronization mode based upon a forecasted wedge TD pattern.

10. The method of claim 9, wherein a substantial majority of the plurality of embedded servo wedges each include a servo header having a concatenated SSM and wedge ID for detecting a servo synchronization signal when read by the head.

11. The method of claim 10, wherein the concatenated SSM and wedge ID is located adjacent to a phase lock loop (PLL) field.

12. The method of claim 11, wherein the concatenated SSM and wedge ID is located adjacent to a track identification field (TKID).

13. The method of claim 9, further comprising:
detecting a first SSM and a first wedge ID; and
decoding the first SSM and the first wedge ID.

14. The method of claim 13, further comprising:
detecting a second SSM and a second wedge ID;
decoding the second SSM and the second wedge ID; and
determining if the second wedge ID has incremented at the expected rate.

15. The method of claim 14, wherein the hard servo synchronization mode based upon the forecasted wedge ID pattern includes performing servo synchronization based upon determining that subsequent wedge IDs of subsequent servo headers include accurately forecasted wedge ID numbers based upon the forecasted wedge ID pattern.

16. A computer system comprising a host computer and a rotating media storage device (RMSD), the RMSD comprising:
a moveable head to perform track following; and
a disk having a circumferential track, the circumferential track having a plurality of embedded servo wedges utilized in track following, the plurality of wedges being spaced sequentially around a circumference of the circumferential track; and
a synch mark detection circuit having a first detection mode and a second detection mode, wherein, in the first detection mode, the synch mark detection circuit detects a servo synchronization signal based on the head reading a servo synchronization mark (SSM) of a servo header of an embedded servo wedge,
wherein, in the second detection inode, the synch mark detection circuit detects a servo synchronization signal based on the head reading a SSM and a wedge identifier (ID) of a servo header of an embedded servo wedge, the wedge ID being utilized in conjunction with the SSM to validate the servo synchronization signal.

17. The computer system of claim 16, wherein a substantial majority of the plurality of embedded servo wedges each include a servo header having a concatenated SSM and wedge ID for detecting a servo synchronization signal when read by the head.

18. The computer system of claim 17, wherein the concatenated SSM and wedge ID is located adjacent to a phase lock loop (PLL) field.

19. The computer system of claim 18, wherein the concatenated SSM and wedge ID is located adjacent to a track identification field (TKID).

20. The computer system of claim 16, wherein the synch mark detection circuit to further,
receive a first SSM and a first wedge ID; and
decode the first SSM and the first wedge ID.

21. The computer system of claim 20, wherein the synch mark detection circuit to further,
receive a second SSM and a second wedge ID;
decode the second SSM and the second wedge ID; and
determine if the second wedge ID has incremented at an expected rate.

22. The computer system of claim 21, wherein, if the second wedge ID has incremented at an expected rate in comparison to the first wedge ID, synch mark detection circuit to declare a hard servo synchronization mode based upon a forecasted wedge ID pattern.

23. The computer system of claim 21, wherein the hard servo synchronization mode based upon the forecasted wedge ID pattern includes performing servo synchronization based upon determining that subsequent wedge IDs of subsequent servo headers include accurately forecasted wedge ID numbers based upon the forecasted wedge ID pattern.

* * * * *

UNITED STATES PATENT AND TRADEMARK OFFICE
CERTIFICATE OF CORRECTION

PATENT NO. : 7,023,639 B1 Page 1 of 1
APPLICATION NO. : 10/815508
DATED : April 4, 2006
INVENTOR(S) : Hanan Kupferman It is certified that error appears in the above-identified patent and that said Letters Patent is hereby corrected as shown below:

Col. 9, Line 53:     Delete "TD" and insert --ID-- therefor.

Col. 10, Line 27:    Delete "inode" and insert --mode-- therefor.

Signed and Sealed this

Ninth Day of January, 2007

JON W. DUDAS
*Director of the United States Patent and Trademark Office*